US012679671B2

(12) United States Patent
Van Beek et al.

(10) Patent No.: US 12,679,671 B2
(45) Date of Patent: Jul. 14, 2026

(54) GRIPPER FOR GRIPPING A SPACER, HANDLING ASSEMBLY COMPRISING SAID GRIPPER, METHOD FOR TRANSFERRING A SPACER FROM A FIRST STATION TO A SECOND STATION AND SPACER POSITIONING UNIT

(71) Applicant: VMI Holland B.V., Epe (NL)

(72) Inventors: Willem Marinus Van Beek, Epe (NL); Timen Anton Van Werven, Epe (NL); Robin Nusselder, Epe (NL)

(73) Assignee: VMI HOLLAND B.V., Epe (NL)

( * ) Notice: Subject to any disclaimer, the term of this patent is extended or adjusted under 35 U.S.C. 154(b) by 0 days.

(21) Appl. No.: 18/711,504

(22) PCT Filed: Nov. 3, 2022

(86) PCT No.: PCT/NL2022/050623
§ 371 (c)(1),
(2) Date: May 17, 2024

(87) PCT Pub. No.: WO2023/091002
PCT Pub. Date: May 25, 2023

(65) Prior Publication Data
US 2025/0011107 A1      Jan. 9, 2025

(30) Foreign Application Priority Data
Nov. 17, 2021    (NL) ...................................... 2029785

(51) Int. Cl.
*B65G 47/91*          (2006.01)
(52) U.S. Cl.
CPC ................................... *B65G 47/91* (2013.01)

(58) Field of Classification Search
CPC . B25J 15/0028; B25J 15/08; B65H 2301/442; B65H 2301/4228; B65H 3/322;
(Continued)

(56) References Cited

U.S. PATENT DOCUMENTS 1,425,836 A * 8/1922 Campbell ............. B25B 27/062
                                                                269/118
3,033,605 A * 5/1962 Morrow, Jr. ........... B65G 47/90
                                                                294/115
(Continued)

FOREIGN PATENT DOCUMENTS

CN        104015385 A     9/2014
CN        104302468 A     1/2015
(Continued)

OTHER PUBLICATIONS

International Search Report and Written Opinion issued in PCT/NL2022/050623, dated Feb. 2, 2023, 10 pages.
(Continued)

*Primary Examiner* — Ronald P Jarrett
(74) *Attorney, Agent, or Firm* — HAYES SOLOWAY P.C.

(57)          ABSTRACT
Disclosed is a gripper for gripping a spacer, preferably a spacer for storing a bead-apex, from a spacer stack having one or more of said spacers, wherein the gripper includes a gripper head extending in an axial direction along a central axis and a plurality of spacer lifting elements protruding from the gripper head for lifting the spacer, wherein the lifting elements are movable with respect to the gripper head for engaging the spacer, wherein the gripper further includes a confining member for confining at least a part of the spacer in the axial direction between said confining member and the lifting elements.

27 Claims, 12 Drawing Sheets

(58) Field of Classification Search
CPC ...... B65H 3/242; B65G 60/00; B65G 56/005; B65G 57/303; B65G 47/90; B29D 30/0016; B29D 2030/0044; B29D 2030/3207; B29D 2030/487
USPC .................. 414/796, 796.1, 910, 911, 789.9
See application file for complete search history.

(56) References Cited

U.S. PATENT DOCUMENTS

| | | | |
|---|---|---|---|
| 3,337,173 A | 8/1967 | Soderquist et al. | |
| 4,279,438 A | 7/1981 | Singh | |
| 4,839,117 A | 6/1989 | Swenson et al. | |
| 4,989,444 A * | 2/1991 | Murakami .............. | B25J 9/042 |
| | | | 72/422 |
| 5,131,971 A | 7/1992 | Elia et al. | |
| 5,172,949 A | 12/1992 | Nagal et al. | |
| 5,207,553 A | 5/1993 | Konagai | |
| 5,395,150 A | 3/1995 | Imler et al. | |
| 5,414,955 A | 5/1995 | Morin | |
| 5,433,815 A | 7/1995 | Aihara et al. | |
| 5,609,377 A | 3/1997 | Tanaka | |
| 6,341,808 B1 | 1/2002 | Baan et al. | |
| 6,916,026 B2 | 7/2005 | Meza | |
| 8,794,288 B2 | 8/2014 | Janszen et al. | |
| 8,939,486 B2 | 1/2015 | Gorham | |
| 10,232,516 B2 | 3/2019 | De Boer et al. | |
| 10,507,698 B2 | 12/2019 | Gonzaga | |
| 11,633,929 B2 | 4/2023 | Bijl et al. | |
| 11,642,795 B1 * | 5/2023 | Marchese ............... | B25J 15/08 |
| | | | 294/198 |
| 2003/0102640 A1 | 6/2003 | Saito | |
| 2003/0102682 A1 | 6/2003 | Kurokawa | |
| 2004/0051323 A1 | 3/2004 | Stohr et al. | |
| 2004/0094979 A1 | 5/2004 | Damhuis | |
| 2008/0080962 A1 | 4/2008 | Holtmeier | |
| 2008/0128093 A1 | 6/2008 | Rogalla et al. | |
| 2010/0043947 A1 * | 2/2010 | Janszen .............. | B29D 30/0016 |
| | | | 156/110.1 |
| 2010/0068012 A1 | 3/2010 | Petijean | |
| 2012/0181804 A1 | 7/2012 | Schmidt et al. | |
| 2013/0008138 A1 | 1/2013 | Subotincic | |
| 2013/0082475 A1 | 4/2013 | Fukano et al. | |
| 2013/0127194 A1 | 5/2013 | Regan et al. | |
| 2013/0129464 A1 | 5/2013 | Regan et al. | |
| 2014/0090528 A1 | 4/2014 | Graf | |
| 2014/0277721 A1 | 9/2014 | Tomo et al. | |
| 2015/0083307 A1 | 3/2015 | Slot et al. | |
| 2015/0298316 A1 | 10/2015 | Accou et al. | |
| 2017/0152115 A1 | 6/2017 | Montoya et al. | |
| 2018/0009111 A1 | 1/2018 | Ho et al. | |
| 2018/0029807 A1 | 2/2018 | Oono | |
| 2023/0124516 A1 | 4/2023 | Conti et al. | |

FOREIGN PATENT DOCUMENTS

| | | | |
|---|---|---|---|
| CN | 107584708 A | 1/2018 | |
| CN | 110087871 A | 8/2019 | |
| CN | 112644048 A | 4/2021 | |
| CN | 220535000 U | 2/2024 | |
| DE | 102006057171 A1 | 6/2008 | |
| DE | 102013102583 A1 | 9/2014 | |
| EP | 2328745 A1 | 6/2011 | |
| EP | 2903810 | 8/2015 | |
| JP | 1991-111336 A2 | 5/1991 | |
| JP | H04251732 | 9/1992 | |
| JP | 1993-147744 A2 | 6/1993 | |
| JP | H05146983 | 6/1993 | |
| JP | H05301302 | 11/1993 | |
| JP | H07157117 | 6/1995 | |
| JP | 2004136607 A | 5/2004 | |
| JP | 2004-345168 A2 | 12/2004 | |
| JP | 2011241028 | 12/2011 | |
| JP | 2012-500139 A2 | 1/2012 | |
| JP | 201318274 A | 1/2013 | |
| JP | 201322714 A | 2/2013 | |
| JP | 2014176926 | 9/2014 | |
| JP | 202082583 A | 6/2020 | |
| JP | 2021-529102 A2 | 10/2021 | |
| KR | 20140050790 | 4/2014 | |
| TW | 201010854 A1 | 3/2010 | |
| WO | 2012172484 A2 | 12/2012 | |
| WO | WO2020242294 A1 | 12/2020 | |

OTHER PUBLICATIONS

International Preliminary Report on Patentability issued in PCT/NL2022/050623, dated May 2, 2024, 7 pages.
International Search Report and Written Opinion issued in PCT/NL2016/050212, dated Aug. 31, 2016, 11 pages.
Decision to Grant issued in corresponding Japanese Patent Application Serial No. 2017-500082, dated Mar. 6, 20148 with translation, 6 pages.
Office Action issued in Chinese Patent Appln. Serial No. 202211028051.6 issued Jun. 20, 2024, with English translation, 10 pages.
Japanese Decision to Grant issued in Japanese Patent Appln. No. 2022-569611, dated May 7, 2024, 5 pages.
Dutch Search Report issued in NL Patent Appln. No. 2029073, dated May 11, 2022, 4 pages.
International Search Report and Written Opinion issued in WO Patent Appln. No. PCT/EP2022/070925, dated Oct. 14, 2022, 9 pages.
Japanese Office Action issued in JP Patent Appln. No. JP2022-569611, dated Nov. 28, 2023, with English translation 4 pages.
International Preliminary Report on Patentability issued in WO Patent Appln. No. PCT/EP2022/070925, dated Feb. 27, 2024, 6 pages.
Notice of Refusal issued in corresponding Japanese Patent Application Serial No. 2023-520107, dated Apr. 25, 2024 with translation, 4 pages.
Decision to Grant issued in corresponding Japanese Patent Application Serial No. 2023-520107, dated Aug. 29, 2024 with translation, 5 pages.

* cited by examiner

8

80

85

82

81

84

F

II                      II

88

8

F 81   88    85

84   80             82

GRIPPER FOR GRIPPING A SPACER, HANDLING ASSEMBLY COMPRISING SAID GRIPPER, METHOD FOR TRANSFERRING A SPACER FROM A FIRST STATION TO A SECOND STATION AND SPACER POSITIONING UNIT

BACKGROUND OF THE INVENTION

The invention relates to a gripper for gripping a spacer for storing a bead-apex. The invention further relates to a handling assembly for handling said spacers, wherein the handling assembly comprises the gripper according to the present invention. The invention further relates to a method for transferring a spacer from a first station to a second station, preferably using the gripper according to the present invention.

Spacers for bead-apexes are generally substantially frus-toconically shaped, comprising a central aperture and a conical support surface extending circumferentially about the central aperture for supporting the bead-apex thereon.

U.S. Pat. No. 8,794,288 B2 discloses a gripper provided with retaining means for retaining a spacer. The retaining means comprise two spacer engagement jaws which are arranged on the spacer lifting means at equal angular distance in circumferential direction. Said jaws are axially inserted into the central aperture of the spacers and are subsequently driven in the radial direction to engage onto corresponding recesses that are arranged in the spacer.

SUMMARY OF THE INVENTION

A disadvantage of the known gripper is that the engagement between the engagement jaws and the corresponding recesses in the spacers is prone to tolerances. Hence, the position and/or orientation of the spacers with respect to the gripper cannot be reliably maintained during transport by said gripper. In other words, the spacers can shift, tilt and/or rotate relative to the gripper. Moreover, when gripping a plurality of spacers, the accumulated tolerances can lead to relative deviations in the position and/or orientation of spacers. Accurate positioning of the spacers is important because subsequent stations need to accurately pick-up and position the bead-apex in the tire. Consequently, the exact position and/or orientation of a bead-apex on the spacer cannot accurately be determined and the overall build quality of a resulting tire comprising said bead-apex may be compromised.

It is an object of the present invention to provide an alternative gripper, handling assembly and method for transferring a spacer in which a spacer can be more reliably retained and/or positioned more accurately.

According to a first aspect, the invention relates to a gripper for retaining a spacer, in particular a spacer for storing a bead-apex, from a spacer stack comprising one or more of said spacers, wherein the gripper comprises a gripper head extending in an axial direction parallel to a central axis and a plurality of spacer lifting elements supported by said gripper head for lifting the spacer from the spacer stack, wherein the lifting elements are movable with respect to the gripper head for contacting the spacer, wherein the gripper further comprises a confining member for confining at least a part of the spacer in the axial direction between said confining member and the lifting elements.

In other words, the spacer can be lifted not only by the lifting elements, but can be confined or clamped between the lifting elements and the confining member as well. Confining the spacer in the axial direction can improve the stability of the spacer with respect to the gripper during movements of said gripper. In particular, tilting of the spacer with respect to the lifting elements of the gripper head can be reduced or ultimately prevented. Hence, the spacer can be lifted more reliably. Additionally, the lifting elements and the confining member can be arranged at a mutual distance in the axial direction to accommodate either a single spacer or a sub-stack of two or more spacers between said lifting elements and confining member. Such a sub-stack of spacers can be reliably retained between the lifting elements and the confining member. Transporting the spacers in a sub-stack instead of one by one can increase the process efficiency.

In an embodiment thereof, the confining member and the lifting elements are movable relative to one another in the axial direction. Preferably, the gripper comprises a gripper drive for driving a relative movement between the lifting elements and the confining member. Hence the spacer can actively be clamped between said lifting elements and said confining member in the axial direction. Thus, said spacer can be lifted more reliably. Moreover, due to the clamping force acting on the spacer, a rotation or tilt of said spacer with respect to the gripper can be prevented. Additionally, a distance between the lifting elements and the confining member can be progressively adjusted to selectively confine and/or clamp either a single spacer or a sub-stack of spacers between the lifting elements and the confining member.

In a further embodiment thereof, the gripper is arranged for confining a sub-stack of at least two spacers, preferably a sub-stack of at least three or at least four spacers, in the axial direction between the confining member and the lifting elements. In other words, the gripper can reliably lift a sub-stack of spacers. Transporting the spacers in a sub-stack instead of one by one can increase the process efficiency.

In a further embodiment, the confining member comprises a confining body extending in a radial plane perpendicular to the central axis. Preferably, the confining body is a clamp ring. The confining body can for example confine an inner rim or a support surface of the spacer. When extending in a radial plane, the confining member can effectively prevent tilting of the spacers with respect to the lifting elements.

In a further embodiment thereof, the confining member comprises one or more cams protruding from the confining body in the axial direction, wherein said one or more cams are arranged to be each inserted into a corresponding notch in the spacer. Preferably said notches are formed in an inner rim of the spacer. Additionally or alternatively, the confining member comprises one or more notches or recesses formed in the confining body for receiving one or more cams protruding from the spacer in the axial direction. When engaged in the notches, the cams can correct a misalignment and/or a rotational misalignment of the spacer with respect to the confining body. Moreover, the one or more cams can prevent or substantially prevent a rotational movement of the spacer about the central axis. In other words, a rotational alignment of the spacers may be fixed or substantially fixed. Hence, the spacer can be lifted more reliably. Preferably, the spacers comprise both notches and cams to enable a mutual interlocking of two adjacently stacked spacers.

In a preferred embodiment thereof, at least one of the one or more cams is tapered or wedged. Hence, the said at least one cam can self-center with respect to a corresponding notch in the spacer or the confining body. Consequently, tolerances between the cam and the notch can be reduced, diminished, or ultimately prevented. Additionally, the spacer can be more accurately positioned with respect to the gripper.

In a further advantageous embodiment, the cams of the plurality of cams are evenly distributed in a circumferential direction about the central axis.

In a further embodiment, the spacer comprises an inner rim defining a central aperture, wherein the gripper head is arranged to reach into said central aperture and wherein the lifting elements are movable to engage said inner rim. By engaging the inner rim of the spacers, the gripper head can be more compact. The gripper head can conveniently reach into the apertures of subsequently stacked spacers to grip a sub-stack of spacers. Moreover, since the gripper head only engages the inner rim of the spacer, the gripper can grip spacers irrespective of the outer dimensions thereof.

In a further embodiment, the gripper head is self-centering with respect to the central aperture of the spacer. Hence, the spacer can be more accurately positioned with respect to the gripper head.

In an embodiment thereof, the gripper head is tapered towards the terminal end thereof. The tapered gripper head can provide an effective centering means for the gripper.

In a further embodiment, the gripper further comprises a detector for detecting the presence of a bead-apex on the spacer. Hence, the gripper can detect whether a bead-apex is present on a respective spacer. The detector may also be applied to a gripper for retaining a spacer for storing a bead-apex that does not comprise the confining member and/or the movability of the lifting elements. In other words, the detector described in relation to the first aspect of the invention can be separately applied to a gripper, i.e., without the limitation of the confining member and/or the movability of the lifting elements.

In an advantageous embodiment thereof, the detector comprises an optical sensor for detecting the presence of a bead-apex on the spacer.

In an alternative embodiment thereof, the detector comprises a contact sensor for detecting the presence of a bead-apex on the spacer. A contact sensor can reliably detect the presence of a bead-apex on a spacer.

In a further embodiment thereof, the detector further comprises a probe which is arranged to be insertable in a radial aperture in a support surface of the spacer. The probe may for example comprise the contact sensor at its terminal end. Alternatively, the probe may be operationally coupled to the contact sensor. Hence, the detector can detect the presence of a bead-apex for a sub-stack of spacers, i.e. when the top most spacer of the sub-stack of spacers is empty, the probe can reach through said top most spacer and detect a presence of a bead-apex on a subsequent spacer.

In a further embodiment thereof the probe is movable relative to the gripper head. Preferably, the gripper comprises a detector drive for driving the movement of the probe relative to the gripper head. Hence, the detector can detect a presence of a bead-apex on a spacer that is lifted by the lifting elements and/or confined between the lifting elements and the confining member. Alternatively, the probe may be fixed with respect to the gripper head.

According to a second aspect the present invention relates to a handling assembly for handling spacers, wherein the handling assembly comprises a first station for receiving a first spacer stack comprising a plurality of spacers, and a second station for receiving a plurality of spacers to form a second spacer stack, wherein the handling assembly further comprises the gripper according to the present invention for transferring a spacer or a sub-stack of spacers from the first spacer stack at the first station to the second station.

The handling assembly incorporates the gripper according to the present invention and, thus, possesses the same advantages as discussed above. The gripper can for example be mounted to a multi-axis robot arm or a multi-directional guide system. The first station and the second station may for example be a first bead-apex supply station and a second bead-apex supply station, respectively, for supplying bead-apexes to a tire building drum. Alternatively, the first station and the second station may be arranged to supply empty spacers to bead-apex assembly unit. Typically, the bead-apexes are transferred one by one from the second station to the tire building drum or from the bead-apex assembly unit to the second station. In contrast, the gripper according to the present invention can transfer a plurality of spacers from the first station to the second station at the same time. In other words, the gripper can transfer the same amount of spacers with less transfer movements. Consequently, when transferring a sub-stack of multiple spacers, the gripper can act as a buffer between the first station and the second station. Hence, the first spacer stack at the first station can be replenished without the need to stop the process at the tire building drum or the bead-apex assembly unit.

According to a third aspect, the present invention relates to a method for transferring a spacer, in particular a spacer for a bead-apex, from a first station to a second station, wherein, at said first station a first spacer stack is provided comprising a plurality of spacers, wherein the method comprises the step of using the gripper according to the present invention to transfer the spacer from the top of the first spacer stack to the second station.

The method incorporates the gripper according to the present invention and, thus possesses the same advantages as described above.

In an alternative embodiment thereof, the method comprises the step of using a spacer gripper to transfer a sub-stack of at least two spacers, preferably at least three or at least four spacers, from the top of the first spacer stack to the second station. In other words, the method comprises gripping multiple spacers, e.g. a stack of spacers, simultaneously. Gripping multiple spacers at the same time can improve process efficiency.

In a further embodiment, the first spacer stack is provided at the first station on a carrier, wherein the method comprises the step of using the spacer gripper to transfer the carrier together with the first spacer stack to the second station. In other words, instead of replacing both the carrier at the first station and the second station, the carrier at the second station can be removed and replaced by the carrier from the first station. Accordingly, by moving the carrier from the first station to the second station, said first station can be emptied and can be ready to receive a further carrier comprising a further stack of spacers. Hence, downtime of the handling assembly can be reduced significantly.

In an embodiment thereof, the first spacer stack comprises at least two spacers, and wherein the transfer of the carrier together with the first spacer stack comprises the steps of:
a) gripping the carrier together with the first spacer stack at the first station using the spacer gripper;
b) depositing the carrier at the second station; and
c) subsequently depositing the at least two spacers of the first spacer stack one by one on the carrier to form a second spacer stack at the second station. Thus, the first spacer stack at the first station can be replenished without or substantially without interrupting the process involving the supply of individual spacers to the second station. While the first stack at the first station is being replenished, the spacer gripper can continue to provide the spacers one by one to the second stack at the second station. The spacer gripper can be arranged to release only the bottom spacer while retaining a remaining sub-stack of spacers. Alternatively, the spacer gripper can be arranged to release the entire sub-stack of spacers and, subsequently, grip a sub-stack of spacers, or a single spacer, comprising one spacer less than the released sub-stack.

In a further embodiment, the method further comprises the step of placing a bead-apex on the top most spacer or removing a bead-apex from said top most spacer at the first station or the second station. In particular, when receiving bead-apexes from a bead-apex processing station, the individual spacers and bead-apexes are placed alternately at the second spacer station. Accordingly, when supplying bead-apexes to a tire building drum, the individual bead-apexes and spacers are alternately removed from the first spacer station.

In a further embodiment, the spacers are individually transferred from the second station to a third station to form a third spacer stack, and wherein the method further comprises the step of using a spacer gripper to transfer a sub-stack of at least two spacers, preferably at least three spacers or at least four spacers, from the top of the third spacer stack at the third station to a fourth station. For example, after the deposit of a bead-apex on said spacer or the removal of a bead-apex from said spacer at the second station, the spacers from the second station can be individually transferred to the third station and stacked to form a third spacer stack. The used spacer gripper can be the same spacer gripper as the spacer gripper used for transferring the spacers from the first spacer stack to the second spacer stack or a further spacer gripper. Advantageously, the spacer gripper can act as a buffer between the third station and the fourth station in a manner similar to the spacer gripper for transferring spacers between the first and second station. Hence, the fourth station can be emptied, i.e. the built up stack of spacers at said fourth station can be removed, without or substantially without interrupting the production process.

In a further embodiment, at least one of the used spacer grippers is the gripper according to the present invention. The method incorporates the gripper according to the present invention and, thus possesses the same advantages as described above.

In an embodiment thereof, the method comprises clamping the sub-stack between the lifting elements and the confining member during the transfer between two respective stations. Hence, the sub-stack can more reliably be retained.

In a further embodiment, the method comprises the steps of:

a) detecting the presence or absence of a bead-apex on the spacer;

b) selecting the second station based on the presence or absence of a bead-apex on the spacer; and c) transferring the spacer from the first station to the selected second station.

Hence, a spacer can selectively be transferred to a corresponding second station based on the detected presence or absence of a bead-apex. For example, when a bead-apex has been checked on irregularities, a disapproved bead-apex is discarded, leaving an empty spacer. An empty spacer may for example be transferred to a storage of empty spacers or supplied to a bead-apex assembly line for receiving a freshly assembled bead-apex. On the other hand, an approved bead-apex could be reintroduced in the production process.

In a preferred embodiment thereof, the presence or absence of the bead-apex on the spacer is detected using the detector of the gripper. Hence, the gripper can detect the presence or absence of a bead-apex on the spacer while transferring said spacer. Hence, process efficiency can be improved.

In a further embodiment, the detector comprises a probe, wherein the step of detecting the presence of a bead-apex on a spacer involves moving said probe relative to the spacer. Preferably, the method comprises the step of lifting the spacer prior to moving the probe towards the spacer. Hence, the probe can be moved over a predetermined distance. Consequently, the probe can more accurately detect the presence of a bead-apex on the spacer.

In a further embodiment, the method comprises the step of inserting the probe in a radial aperture in a support surface of a top most spacer of a sub-stack of spacers to detect the presence of a bead-apex on a subsequent spacer in said sub-stack of spacers. Hence, said detector can detect the presence of a bead-apex for a sub-stack of spacers, i.e. when the top most spacer of the sub-stack of spacers is empty, the probe can reach through said top most spacer and detect a presence of a bead-apex on a subsequent spacer.

According to a fourth aspect, the invention relates to a positioning unit for positioning a spacer, wherein the positioning unit comprises a positioning head extending in an axial direction along a central axis, wherein the positioning head is at least partly insertable into an opening of the spacer and wherein the positioning head comprises a tapering surface for centering the spacer with respect to the central axis, wherein the positioning unit further comprises a positioning profile for adjusting a rotational position of the spacer with respect to the central axis, wherein the positioning profile extends circumferentially about the central axis and is complementary to a profile of the spacer for cooperating with said profile of the spacer.

The positioning unit can thus center and/or rotationally align a spacer with respect to the positioning head. Hence, said spacer can be more accurately and/or precisely positioned and/or aligned prior to gripping the spacer. Accordingly, a placement of a bead-apex on the spacer can be determined more accurately and/or precisely. Hence the quality of a resulting tire can be improved.

Preferably the positioning profile and/or the positioning unit are rotatable about the central axis for adjusting the rotational position of the spacer with respect to the central axis.

In an embodiment thereof, the positioning profile comprises one or more cams protruding from the positioning head in the axial direction, wherein said one or more cams are arranged to be each inserted into a corresponding notch in the spacer. Alternatively, the positioning profile comprises one or more notches or recesses formed in the positioning head for receiving one or more cams protruding from the spacer in the axial direction. As a further alternative, the profiles may for example extend at least partly in a radial direction with respect to the central axis, e.g. the profiles may form a bayonet mount.

In an embodiment thereof, at least one of the one or more cams is tapered. The tapering of the cams can urge the notches into a central position with respect to said cams. Hence, small deviations in the angular position of the spacer can be adjusted by inserting the cams into the notches.

In a preferred embodiment thereof, the one or more cams are evenly distributed in a circumferential direction about the central axis.

According to a fifth aspect, the invention provides a method for positioning a spacer relative to a central axis, wherein the method comprises the steps of:

a) centering the spacer with respect to the central axis;

b) rotating the spacer about said central axis into a predetermined rotational position.

In other words, the spacer can be centered and rotationally aligned with respect to the central axis. Hence, said spacer can be more accurately and/or precisely positioned and/or aligned prior to a consecutive step of gripping the spacer. Accordingly, a placement of a bead-apex on the spacer can be determined more accurately and/or precisely. Hence the quality of a resulting tire can be improved.

In an embodiment thereof, the method comprises using the positioning unit according to the third aspect of the invention or the gripper according to the first aspect of the invention. Both the positioning unit according to the third aspect and the gripper according to the first aspect can be suitable for carrying out the method of the fifth aspect of the invention.

In a further embodiment thereof, the spacer comprises a profile and wherein the gripper or the positioning unit comprises a complementary profile, wherein step b) comprises interlocking the profile of the spacer with the complementary profile of the gripper or the positioning unit. Preferably, at least on of the profiles comprise at least one tapering cam for cooperating with a corresponding notch in the complementary profile. The tapering of the cam can urge the notch into a central position with respect to said cams. Hence, small deviations in the angular position of the spacer can be adjusted by inserting the cams into the notches. Alternatively or additionally, the method may comprise rotating at least a part of the gripper or the positioning unit for adjusting an angular position of the spacer.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which.

DETAILED DESCRIPTION OF THE INVENTION

Figures 1, 2:
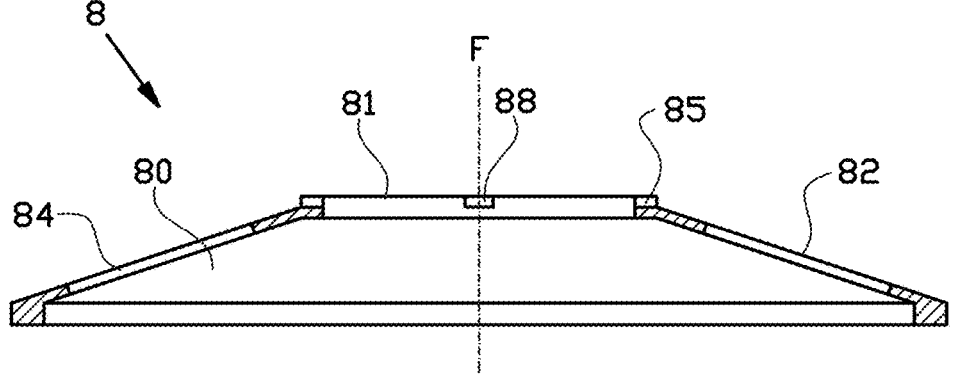
FIG. 1 shows a spacer for a bead-apex.
FIG. 2 shows a section view of the spacer according to the line II-II in FIG. 1.

FIGS. 5-8 show a gripper 2 for retaining a separator or spacer 8, in particular a separator or spacer 8 for bead-apexes 9, according to an embodiment of the present invention. The gripper 2 is arranged for retaining empty separators or spacers 8 as well as separators or spacers 8 with a bead-apex 9 stored thereon. The gripper 2 can for example be mounted to a multi-axis robotic arm or a multidirectional guide system for transferring said separator or spacer 8 between different steps of a tire building process.

Figures 3, 4:
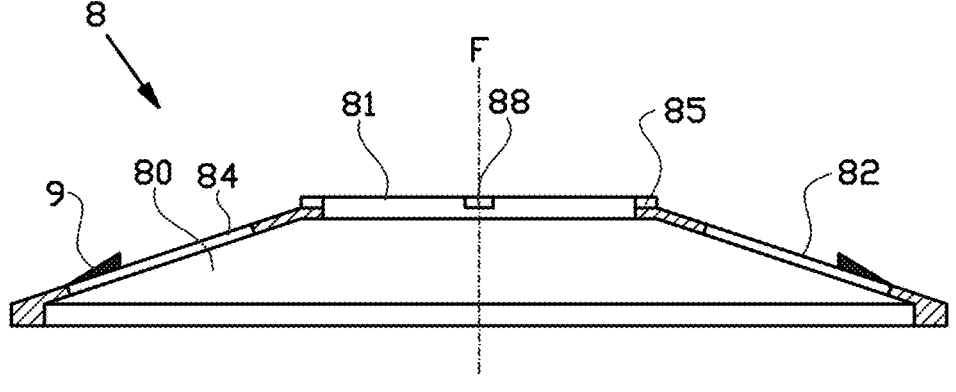
FIG. 3 shows the spacer according to FIG. 1 with a bead-apex.
FIG. 4 shows a section view of the spacer and bead-apex according to the line IV-IV in FIG. 3.

An example of a spacer 8 is shown in more detail in FIGS. 1-4. The spacer 8 comprises a spacer body 80 extending circumferentially about a spacer axis F. Typically, said spacer body 80 is frustoconical or substantially frustoconical. Alternatively, the spacer body 80 may for example be flat, substantially flat, convex or substantially convex. As is best shown in FIGS. 3 and 4, the spacer body 80 forms a support surface 82 for supporting a bead-apex 9 thereon. Said support surface 82 is generally conical to correspond to the outline of the bead-apex 9.

The spacer 8 comprises a central aperture 81 extending through the spacer body 80 along said center axis F. As is shown in FIGS. 1 and 3, the central aperture 81 is circular or generally circular in cross section. The spacer 8 further comprises an inner rim 85 extending circumferentially about the center axis F and limiting the central aperture 81 radially. Said inner rim 85 is arranged to provide structural integrity to the spacer 8.

As is further shown in FIGS. 1-4, the spacer 8 comprises radial apertures 84 extending axially through the support surface 82. Said radial apertures 84 extend radially with respect to the spacer axis F. The radial apertures 84 are arranged to facilitate the placement of a bead-apex 9 on the support surface 82 and/or the removal of said bead-apex 9 from the support surface 82. Preferably, said apertures 84 extend up to the inner rim 85.

As is shown in FIGS. 5-8, the gripper comprises a gripper head 3. The gripper head 3 is arranged to reach into a central aperture 81 of the spacer 8. The gripper head extends in an axial direction X parallel to a central axis C. The gripper 2 further comprises a plurality of spacer lifting elements 31 for supporting the spacer 8.

In the embodiment as shown, the gripper head 3 comprises a plurality of guide elements 30, each extending in the axial direction X. In this particular embodiment, the guide elements 30 are rods. Said plurality of guide elements are preferably distributed along a circumferential direction about the gripper axis C. Alternatively, the gripper head 3 may for example be formed as a single body. The gripper head 3 is tapered towards the terminal end thereof. The tapering may improve the centering of the spacer 8 with respect to the gripper head 3. In particular, the plurality of guide elements 30 are beveled at the terminal ends thereof, to provide a tapered or generally tapered terminal gripper head 3.

The lifting elements 31 are supported by the gripper head 3. In particular, the lifting elements 31 are supported by the plurality of guide elements 30. Preferably, each lifting element 31 is supported by a respective one of the plurality of guide elements 30. The lifting elements 31 are movable within the said central aperture 81 for contacting the spacer 8 when the gripper head 3 reaches into said central aperture 81.

In the embodiment as shown, the lifting elements 31 are movable with at least a vector component in a radial direction R, perpendicular to the axial direction X, for contacting the spacer 8. In the embodiment as shown, the lifting elements 31 are hingedly supported to the plurality of guide elements 30. In particular, the lifting elements 31 are each rotatable about a rotation axis thereof extending tangent or generally tangent to a circumferential direction about the central axis C to contact the spacer 8. Alternatively, the lifting elements 31 may for example be linearly movable in the radial direction R or in a direction having a vector component in the radial direction R an additional vector component in the axial direction X and/or a tangential direction.

Figure 5:
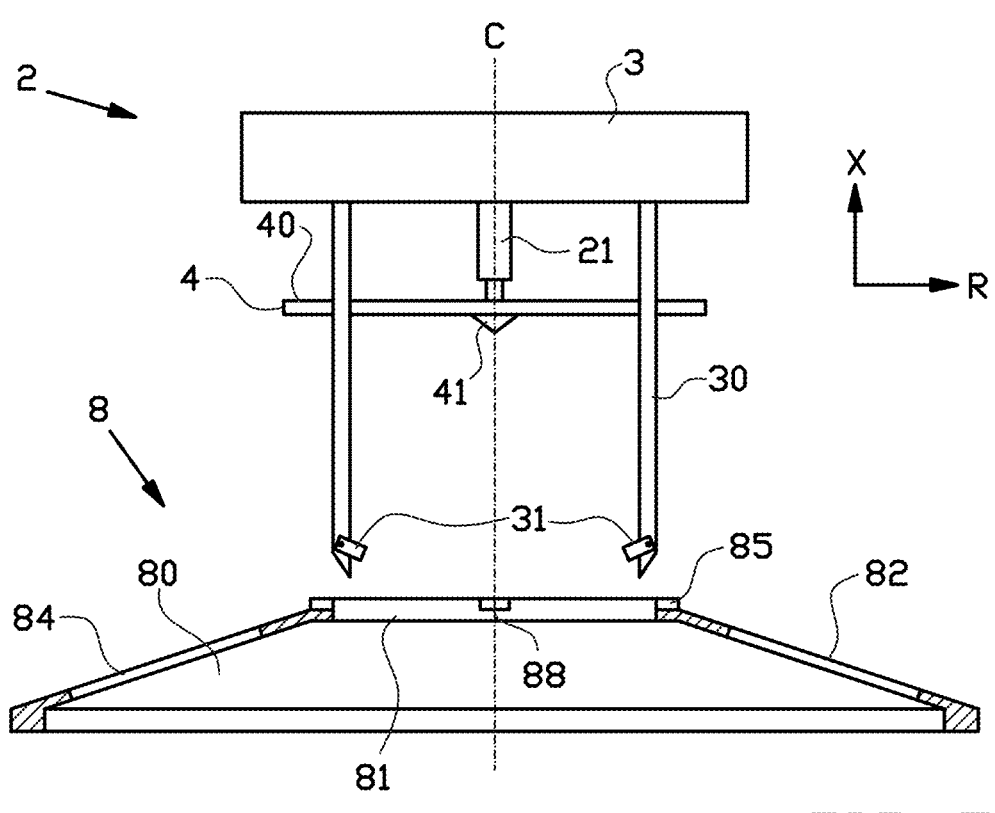
FIGS. 5-7 show a gripper according to an embodiment of the present invention during exemplary steps of picking up a spacer.
Figure 6:
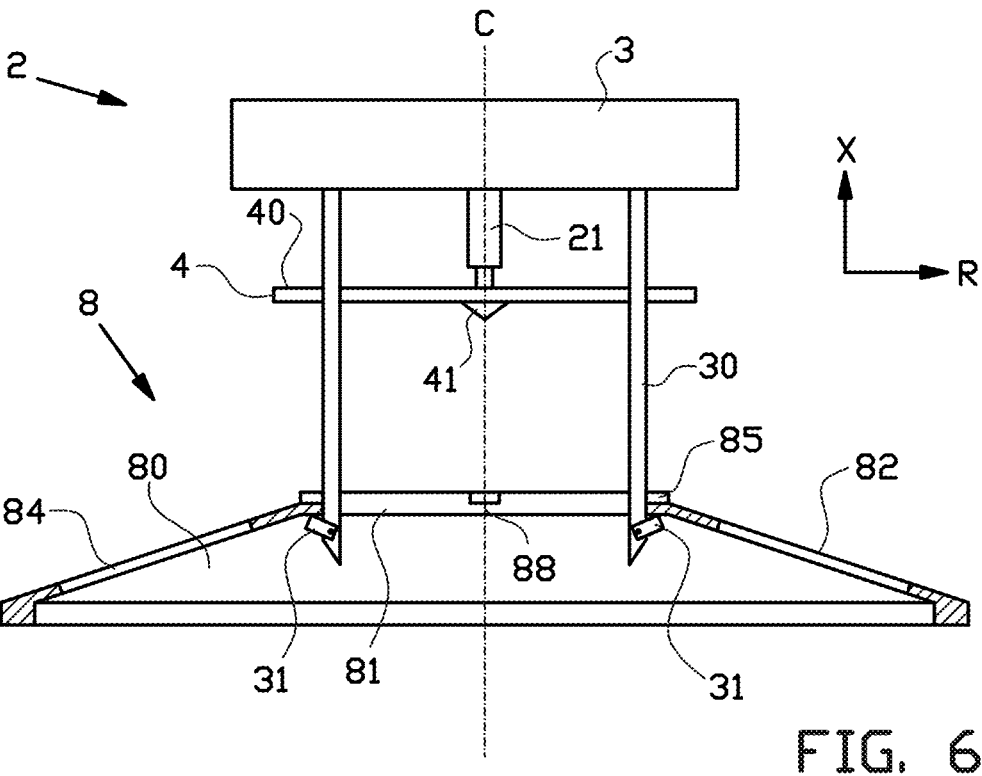

The lifting elements 31 can rotate between a first as shown in FIG. 5 and a second position as shown in FIG. 6. In said first position, the lifting elements 31 are arranged radially inward with respect to the plurality of guide elements 30 to allow the gripper head 3 to be inserted into the central aperture 81 of the spacer 8. In the second position, the lifting elements 31 have been rotated outwards to contact a lower surface of the rim 85 of the spacer 8. Alternatively, the lifting elements 31 may for example reach into a recess in the spacer 8.

In a further alternative (not shown), the lifting elements 31 may form a bayonet type coupling with the spacer 8. In other words, the lifting elements 31 may be rotatable with respect to the spacer 8 about the central axis C to engage the spacer 8.

As is further shown in FIGS. 5-8, the gripper 2 comprises a confining member 4. The confining member 4 is arranged for confining at least a part of the spacer 8 between said confining member 4 and the lifting elements 31.

The confining member 4 comprises a confining body 40. Said confining body 40 extends in a radial plane perpendicular to the central axis C. In this particular embodiment, the confining body 40 is an annular or ring shaped body extending circumferentially about the central axis C.

In this particular embodiment, the confining member 4 is arranged to secure an upper surface of the inner rim 85 of the spacer 8. In other words, the gripper 2 is adapted to confine the inner rim 85 between the lifting elements 31 and the confining member 4. Alternatively, the confining member 4 may for example be adapted to secure an outer rim of the spacer 8.

The confining member 4 and the lifting elements 31 are movable relative to one another in the axial direction X. As is further shown in FIG. 8, the gripper 2 is preferably arranged for confining a sub-stack D of at least two spacers 8 in the axial direction X between the confining member 4 and the lifting elements 31. More preferably, the gripper is arranged for confining a sub-stack D of three or four spacers 8.

In the embodiment as shown in FIGS. 5-8, the confining member 4 is movable with respect to the lifting elements 31. Alternatively, the lifting elements 31 may be movable with respect to the confining member 4.

As a further alternative, the confining member 4 and the lifting elements 31 may be arranged at a fixed mutual distance. Said distance may be adapted to confine a discrete number of spacers 8. The lifting elements 31 may be arranged to clamp said discrete number of spacers 8 between said lifting elements 31 and the confining member 4.

As is further shown in FIGS. 5-8, the gripper 2 comprises a gripper drive 21 for affecting the relative movement between the confining member 4 and the lifting elements 31. Preferably, said gripper drive 21 is a linear drive, such as a pneumatic cylinder, or a spindle drive. The gripper drive 21 is arranged to clamp one or more spacers 8 between the lifting elements 31 and the confining member 4. Additionally or alternatively, the confining member 4 may for example be biased towards the lifting elements 31, e.g. by gravity or a spring element.

As is further shown in FIGS. 5-8, the confining member 4 comprises a cam 41. Said cam 41 protrudes from the confining body 40 in the axial direction X. Additionally or alternatively, the cam 41 may for example protrude radially inward or radially outward. As is best shown in FIGS. 1-4, the spacers 8 are provided with a plurality of recesses or notches 88. In the embodiment as shown, said recesses or notches 88 are formed in the inner rim 85 of the spacer 8. Preferably, the confining member 4 comprises two or more of said cams 41, each arranged to be inserted in a corresponding recess or notch 88 of the spacer 8. The cams 41 are preferably evenly distributed in a circumferential direction about the central axis C.

As is further shown in FIGS. 5-8, the cams 41 are tapered. Said tapered shape may allow the cams to self-center within a respective recess or notch 88. The recess notch 88 itself may have a rectangular or generally rectangular cross-section. Additionally or alternatively, the recess or notch 88 may be tapered. Said tapered recess or notch 88 may also allow to center a cam 41 with a rectangular or substantially rectangular cross-section.

Figure 17:
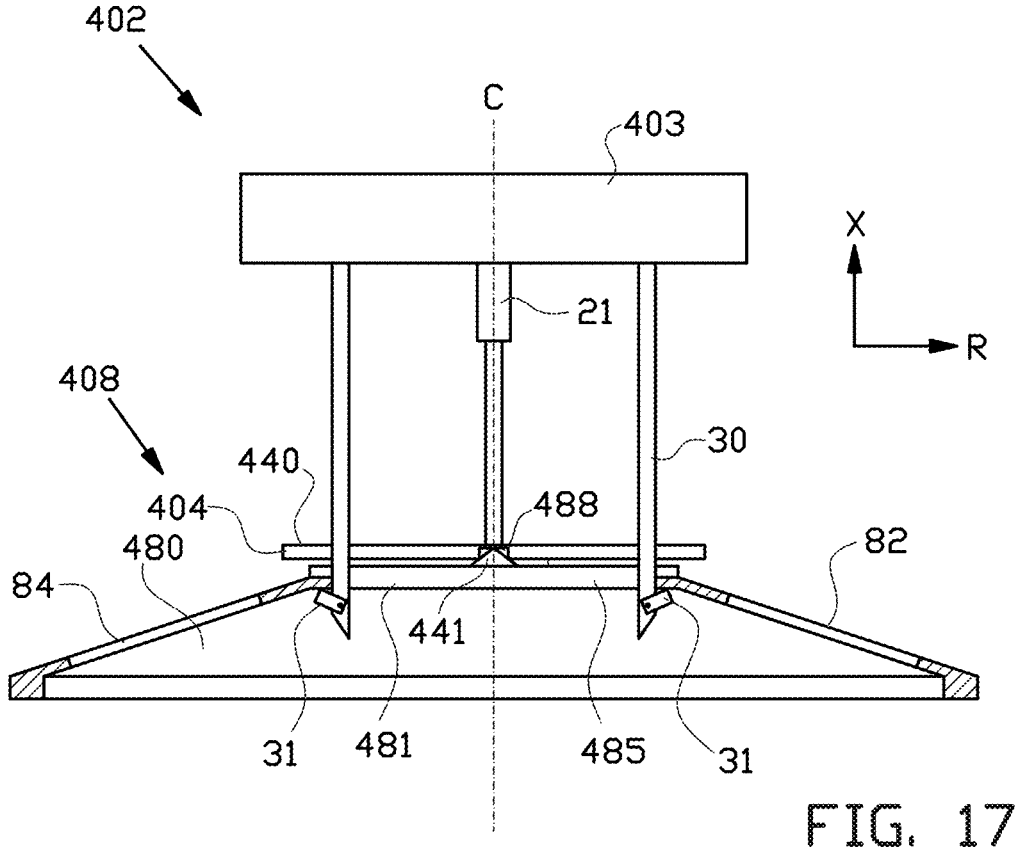
FIG. 17 shows a further alternative gripper according to another embodiment of the present invention.

Alternative configurations of interlocking and/or complementary profiles, e.g. corresponding sets of cams and respective recesses or notches, will be apparent to the person having ordinary skills in the art. For example, as shown in the embodiment of FIG. 17, the confining member 404 comprises one or more notches 442 or recesses formed in the confining body 440 for receiving one or more cams 441 protruding from the spacer 408, in particular from the inner rim 485, in the axial direction X. Alternatively, both the confining body 440 and the spacer 408 may be provided with a complementary set of cams and notches or recesses. As an even further alternative, the lifting element 31 and/or the guide elements 30 of the gripper head 403 may be provided with one or more cams, recesses and/or notches to cooperate one or more complementary cams, recesses and/or notches of the spacer 408.

Additionally, the spacers 408 may, at a first side of the spacer body 480, be provided with cams and, at a second side, opposite to the first side with respect to the spacer body 480, with recesses or notches 488. Hence, the cams of a first spacer 408 may cooperate with the recesses or notches 488 of an adjacently stacked spacer 408.

Figures 9, 10:
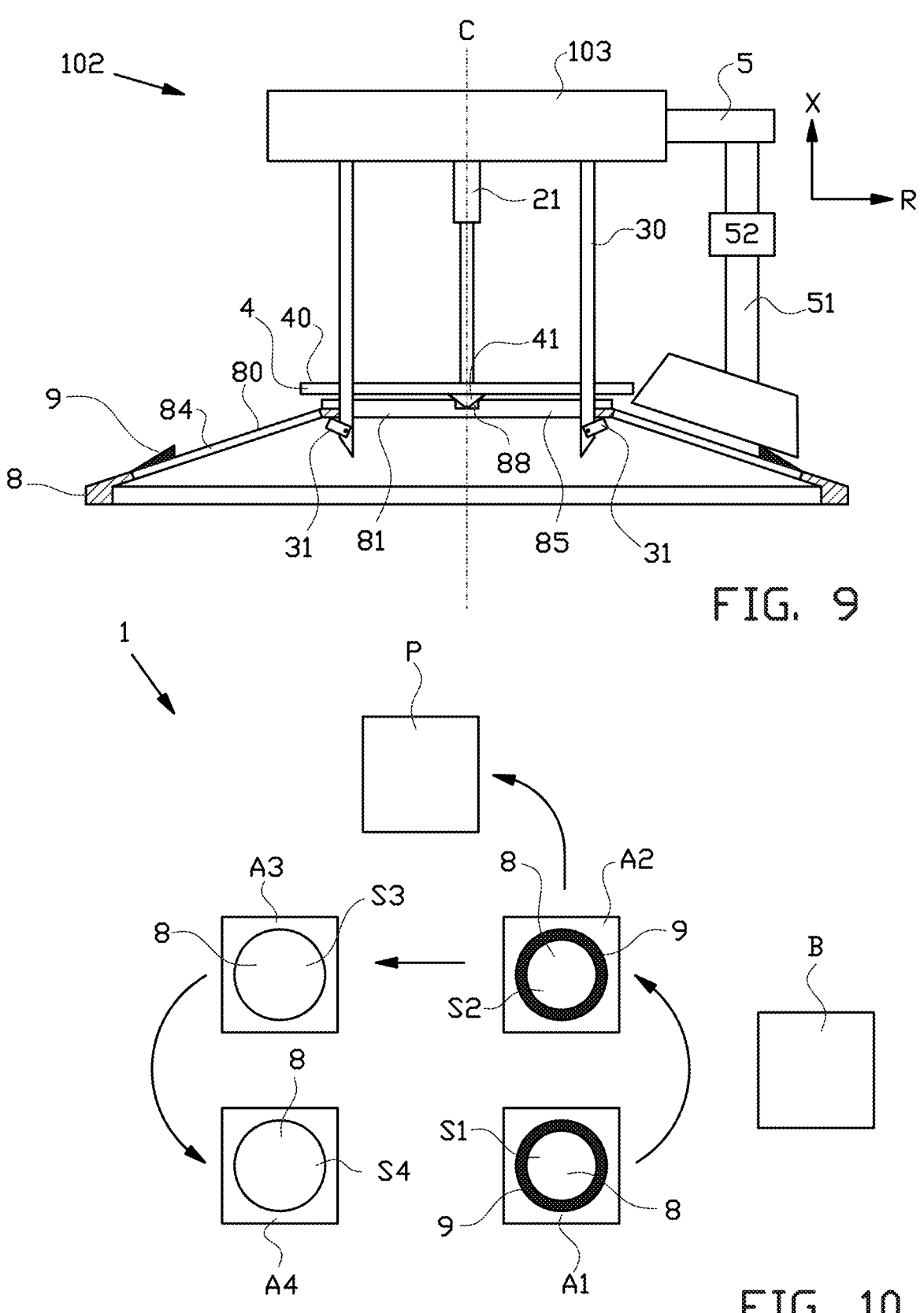
FIG. 9 shows an alternative gripper according to an alternative embodiment of the present invention.
FIGS. 10 and 11 show a handling assembly for spacers according to the present invention.
Figure 11:
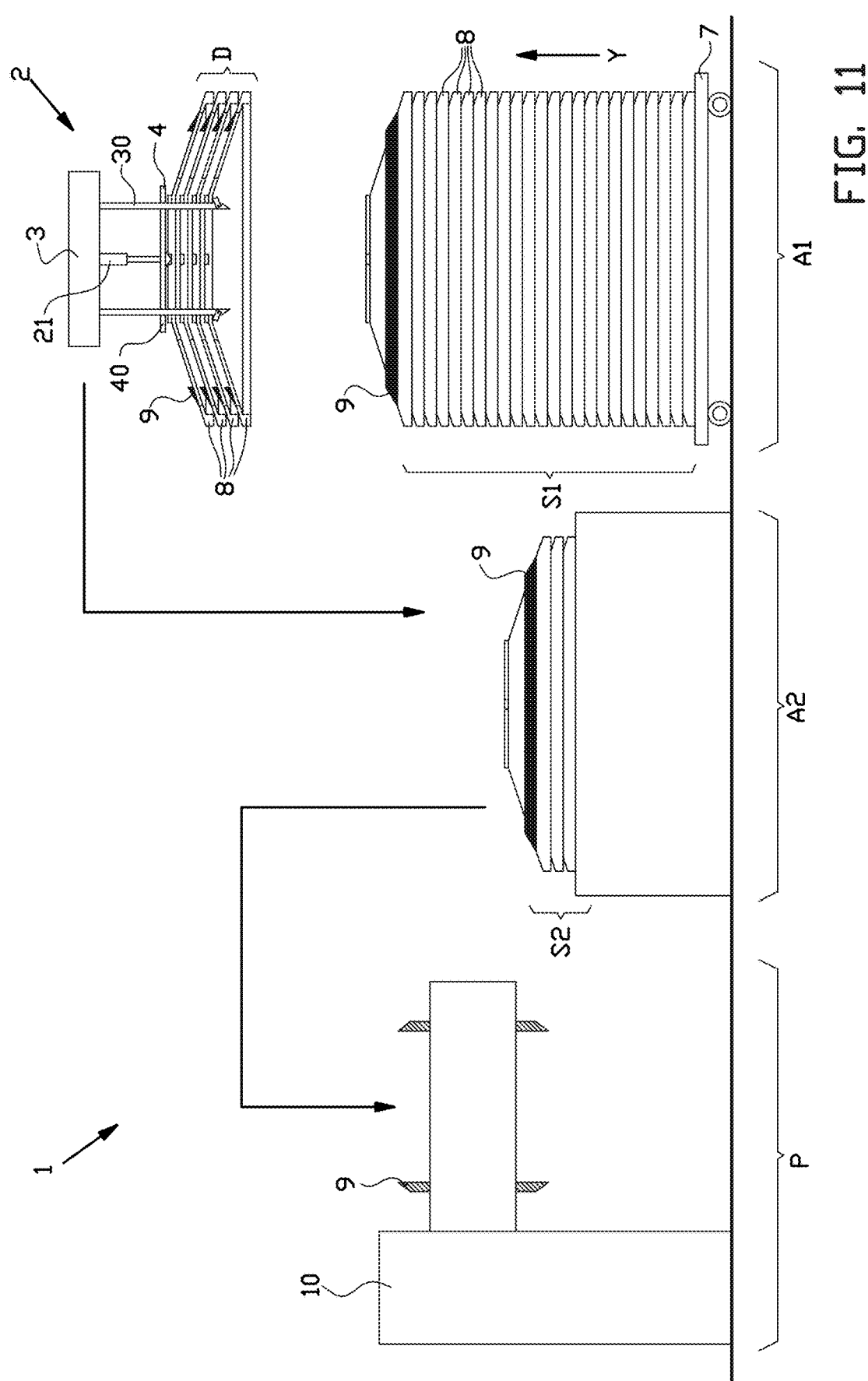

FIGS. 10 and 11 show a production line or handling assembly 1 for handling spacers 8, in particular spacers 8 for bead-apexes 9, according to a second aspect of the present invention. As is shown in FIG. 11, the handling assembly 1 comprises the gripper 2 according to the present invention.

The handling assembly 1 comprises a first station A1 for receiving a plurality of spacers 8 to form a first spacer stack S1. The spacers 8 are stacked in a stacking direction Y. Preferably, said stacking direction Y is vertical or substantially vertical. The handling assembly 1 further comprises a second station A2 for receiving a plurality of spacers 8 to form a second spacer stack S2. The spacers 8 of the second spacer stack S2 are stacked in the stacking direction Y as well. The gripper 2 is arranged for transferring a spacer 8 or a sub-stack D of spacers 8 from the first spacer stack S1 at the first station A1 to the second spacer stack S2 at the second station A2. For this purpose, the gripper 2 may for example be mounted to a multi-axis robot arm or a multi-directional guide system.

The production line or handling assembly 1 further comprises a processing station P. Said processing station P may either be arranged to receive a bead-apex 9 from one of the spacers 8 at the second station A2 or to provide a bead-apex 9 to one of the spacers 8 at the second station A2. The gripper 2 according to the invention may be arranged to transfer the bead-apex 9 between the spacer 8 at the second station A2 and the processing station P. Alternatively, a further gripper may be provided to transfer the bead-apex 9 between the spacer 8 at the second station A2 and the processing station P.

As is shown in FIG. 11, the first station A1 may comprise a carrier 7, for example a cart, pallet, carriage or cartridge for supporting the first spacer stack S1. When fully or partly emptied, said carrier 7 may be replaced with a further carrier 7 comprising a further stack of spacers 8 to be transferred to the second station A2.

In the embodiment as shown in FIGS. 10 and 11, the handling assembly 1 forms at least a part of a tire building production line. The handling assembly 1 comprises a tire building drum 10 at the processing station P. The first station A1 and the second station A2 are supply stations for supplying bead-apexes 9 to said tire building drum 10. The spacers 8 of the first spacer stack S1 are each carrying a respective bead-apex 9. The gripper 2 is arranged to grip one or more of the spacers 8 with the bead-apexes 9 thereon and transfer said one or more spacers 8 to the second spacer stack S2 at the second station A2. The handling assembly 1 is further arranged to transfer the bead-apex 9 of the spacer 8 at the top of the second spacer stack S2 to the tire building drum 10.

As can further be seen in FIG. 10, the production line or handling assembly 1 further comprises a third station A3 for receiving a third spacers stack S3 and a fourth station A4 for receiving a fourth spacer stack S4. The third station A3 is arranged for receiving a spacer 8 from the second spacer stack S2. In particular, the third station A3 is arranged to receive the spacer 8 from the second spacer stack S2 after the bead-apex 9 has been transferred from said spacer 8 to the tire building drum 10.

The fourth station A4 is arranged for receiving the empty spacers 8 from the third spacer stack S3. The gripper 2 of the handling assembly 1 may be used for transferring one or more empty spacers 8 simultaneously from the third spacer stack S3 to the fourth spacer stack S4 at the fourth station A4. Alternatively, a further gripper may be used for transferring the spacers 8 from the third station A3 to the fourth station A4.

Similar to the first station A1, the fourth station A4 may comprise a cart or cartridge (not shown) for receiving the fourth spacer stack S4. Said cart or cartridge at the fourth station A4 may be for example replaced when a predetermined number of empty spacers 8 has been stacked on the fourth spacer stack S4.

In an alternative embodiment (not shown), the handling assembly 1 forms at least a part of a bead-apex production line. In this embodiment, the processing station P may for example be a bead-apex assembly unit. The first station A1 and the second station A2 are arranged to supply empty spacers 8 to the processing station P. The handling assembly 1 is arranged to supply or transfer an assembled bead-apex 9 to an empty spacer 8 at the second station A2. The spacer 8 with the bead-apex 9 thereon can be transferred to the third station A3 and subsequently to the fourth station A4.

A method for transferring a spacer 8, using the gripper 2, will now be described using FIGS. 5-11.

As is shown in FIGS. 10 and 11, the method comprises the step of providing the first spacer stack S1 at the first station A1. in this particular embodiment, he spacers 8 of the first spacer stack S1 are each provided with a bead-apex 9. The method further comprises the steps of gripping one or more of the spacers 8 at said first spacer stack S1 and transferring said one or more spacers 8 to the second station A2. Said steps are described in more detail below.

As is shown in FIG. 5, the method comprises moving the gripper 2 into a position above one of the spacers 8. In particular, the gripper 2 has been moved into a position above first spacer stack S1. The central axis C of the gripper 2 is in line or substantially in line with the spacer axis F.

As is shown in FIG. 6, the method comprises moving the gripper in the axial direction X with respect to the spacer 8. The gripper head 3 is inserted through the central aperture 81 in the spacer 8. The gripper head 3 is centered by the bevelled edged of the guide elements 30. Subsequently, the lifting elements 31 are moved radially outward, i.e. rotated about their respective rotation axes, into contact with the rim 85 of the spacer 8.

Figures 7, 8:
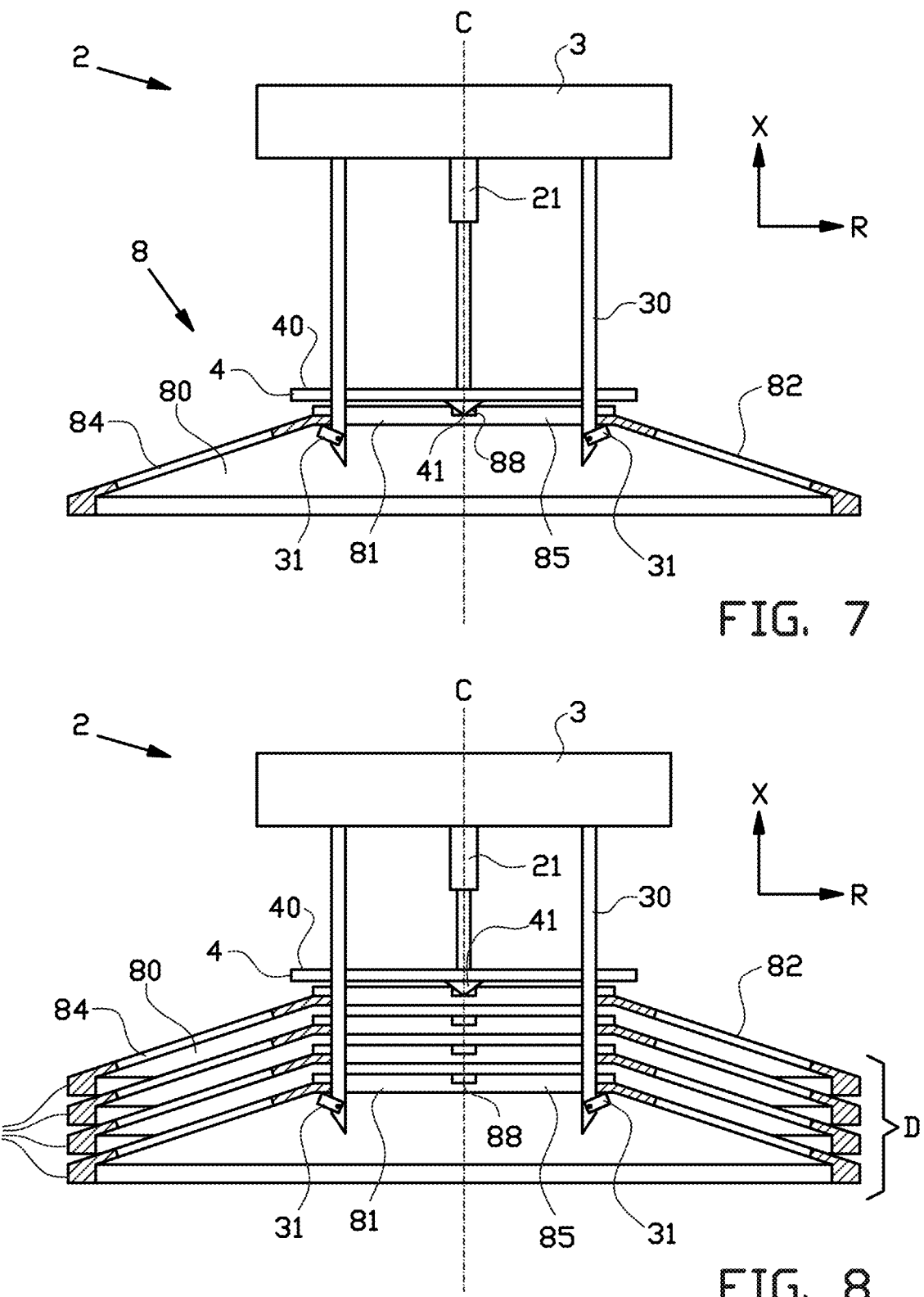
FIG. 8 shows the gripper of FIGS. 5-7 while lifting a plurality of spacers.

Preferably, as is shown in FIG. 8, the gripper head 3 is inserted into the central apertures 81 of a spacer stack S1, S2, S3, S4 or sub-stack D of two or more spacers 8. In the embodiment as shown in FIG. 8, the gripper head 3 is inserted into the central apertures 81 of a sub-stack D of four spacers 8. Subsequently, the lifting elements 31 are moved radially outward to contact the lowermost spacer 8 of the sub-stack D of four spacers 8.

As is shown in FIGS. 7 and 8, the method further comprises moving the confining member 4 relative to the lifting elements 31 in the axial direction X. In particular, the confining member 4 is moved into clamping contact with the spacer 8. The spacer 8 is centered with respect to the gripper 2 by the insertion of the cam 41 in the notch 88 of the spacer 8. Additionally, an orientation of the spacer 8 with respect to the gripper head 3 may be affected by the insertion of the cam 41 in the notch 88 of the spacer 8. In particular, a rotational or angular position of the spacer 8 with respect to the central axis C may be affected by insertion of the cam 41 in the notch 88 of the spacer 8. As is shown in FIG. 8, when retaining the sub-stack D of spacers 8, the confining member 4 is contacting the topmost spacer 8 of the sub-stack D of spacers 8.

Instead of centering and orientating the spacer 8 with respect to the gripper head 3 while confining said spacer between the confining member 4 and the lifting elements 31, i.e. while gripping the spacer 8, the spacer 8 may be centered and/or orientated with respect to the central axis C prior to confining and/or gripping the spacer 8. The spacer 8 may for example be provided on a reference surface (not shown), such as a conveyor, or on top of a stack of spacers, for supporting said spacer 8.

The centering and/or orientating of the spacer 8 prior to confining and/or gripping the spacer 8 may be performed by the gripper 1 according to the present invention. In this case, the gripper head 3 is inserted through the central aperture 81 in the spacer 8. The spacer 8 is centered about the central axis C by a tapering surface of the gripper head 3, i.e. by the bevelled edges on the lifting elements 31. Simultaneously and/or subsequently, the interlocking or complementary profiles of the gripper head 3 and the spacer 8, i.e. the cam 41 and the notch 88, respectively, are mutually engaged to affect a rotational or angular orientation of the spacer 8 with respect to the gripper head 3 about the central axis C.

Alternatively, a separate positioning unit may be provided (not shown) for centering and/or orientating the spacer 8.

Analogue to the abovementioned gripper 1, the separate positioning unit comprises a positioning head with a tapering surface tapering along the central axis C. The separate positioning unit further comprises a profile that is interlocking with and/or complementary to a profile of the spacer 8. The separate positioning unit may for example comprises a cam similar to the cam 41 of the gripper head 3 for cooperating with the notch 88 in the spacer 8.

As is shown in FIG. 11, the method further comprises the step of transferring the sub-stack D of spacers 8 from the first spacer stack S1 to the second station A2. Said sub-stack D may be deposited on top of a spacer 8 or a second spacer stack S2 already present at the second station A2 or may form the second spacer stack S2. Preferably, the sub-stack D is transferred to the second station A2 when the second spacer stack S2 has been depleted. The sub-stack D may form a buffer to allow the exchange of the carrier 7 at the first station A1, without the need to interrupt the tire production process at the tire building drum 10.

As is shown in FIGS. 10 and 11, the method further comprises the step of transferring the bead-apex 9 of the topmost spacers 8 at the second station A2 to the tire building drum 10 at the processing station P. As is shown in FIG. 10, subsequently or simultaneously, the now empty spacer 8 is transferred from the second station A2 to the third station A3. The empty spacers 8 are individually transferred from the second station A2 to the third station A3.

The empty spacers 8 form the third station A3 are transferred to the fourth station A4 to form the fourth spacer stack S4. In particular, a sub-stack D of at least two empty spacers 8 is transferred from the third station A3 to the fourth station A4. Preferably, the sub-stack D comprises at least three spacers 8. More preferably, the sub-stack D comprises at least four spacers 8. Similar to the transfer of the spacers 8 between the first station A1 and the second station A2, the sub-stack D may form a buffer to allow the exchange of the carrier 7 at the fourth station A4, without the need to interrupt the tire production process at the tire building drum 10.

The spacers 8 are transferred from the third station A3 to the fourth station A4 using a spacer gripper. Preferably, said spacer gripper is a gripper 2 according to the present invention. Said gripper 2 may be the same gripper 2 used for transferring the spacers 8 from the first station A1 to the second station A2. Alternatively a second gripper 2 may be used.

FIG. 9 shows an alternative gripper 102 according to an alternative embodiment of the invention. The alternative gripper 102 differs from the previously discussed gripper 2 in that a the gripper head 103 is provided with a detector 5 for detecting the presence of a bead-apex 9 on a spacer 8. In particular, the detector 5 comprises a contact sensor for detecting the presence of the bead-apex 9 on the spacer 8. Alternatively, the detector 5 may for example comprise an optical sensor for detecting the presence of the bead-apex 9 on the spacer 8.

As is shown in FIG. 10, the handling assembly 1 may for example comprise a check station B for checking features of the bead-apex 9, such as weight or splice quality. Depending on the check, a bead-apex may be approved or rejected and removed or discarded from the spacer 8. When picking up a spacer 8 from the check station B, the gripper 102 may thus detect the presence of the bead-apex 9 on the spacer 8 at said check station B or when transferring said spacer 8. Accordingly, in response to a detected presence or absence of a bead-apex 9 on the spacer 8 the gripper may automatically transfer the spacer 8 to a follow-up station. For example, the gripper 102 may transfer a spacer 8 having a bead-apex thereon to the first station A1 to be supplied to the tire building drum 10. In other words, the spacer 8 and, more particularly, the bead-apex may be reintroduced in the tire production process. Alternatively, the gripper 102 may transfer an empty spacer 8 to the fourth station A4 or to a bead-apex assembly line for receiving a further bead-apex 9.

In the embodiment as shown in FIG. 9, the gripper 102 comprises a detector drive 52 to drive a movement of at least a part of the detector 5 relative to the gripper head 103. Alternatively, the detector 5 may be movable in the axial direction together with the gripper head 103.

The detector 5 comprises a probe 51 for contacting a bead-apex 9 present on the spacer 8. Said probe 51 extends in or substantially in the axial direction X. The contact sensor may for example be located at the terminal end of the probe 51 or integrated in said probe 51.

Preferably, the terminal end of the probe 51 is adapted to the orientation of the support surface 82 of the spacer 8. In particular, the terminal end of the probe 51 is arranged to extend along the support surface 82 of the spacer 8 at the same or substantially the same angle with respect to a radial plane perpendicular to the central axis C.

Preferably, the probe is insertable through one of the radial apertures 84 of the spacer 8. Hence, the probe 51 can reach through a topmost spacer 8 to detect a presence of a bead-apex 9 on a spacer 8 below. Preferably, the probe 51 is adapted to extend along the entire radial length of said radial aperture 84. Hence, the detector 5 may detect the presence of a bead-apex 9 located at any radial position within the range of the radial aperture 84.

A method for using the alternative gripper 102 is now described using FIG. 9. The method involves the steps of gripping the spacer 8 and detecting the presence of a bead-apex 9 on said spacer 8 using the detector 5. The detecting of the presence of the bead-apex 9 on the spacer 8 may take place before, after or during the step of gripping the spacer 8.

The method further comprises the step of selectively transferring the spacer 8 to a follow-up station, based on the output of the sensor of the detector.

FIGS. 12-15 show a further handling assembly 201 and method steps for handling spacers 8 according to an alternative embodiment of the present invention. The handling assembly 201 comprises a first station A5 for receiving a first stack S5 of empty spacers 8. In other words, the first station A5 is a supply station for supplying empty spacers 8 to the bead-apex processing station. The handling assembly 201 further comprises a second station A6 which is arranged for alternately receiving empty spacers 8 from the first spacer stack S5 and bead-apexes 9 from a bead-apex processing station (not shown) to form a second spacer stack S6 of spacers 8 each comprising a bead-apex 9.

Figure 15:
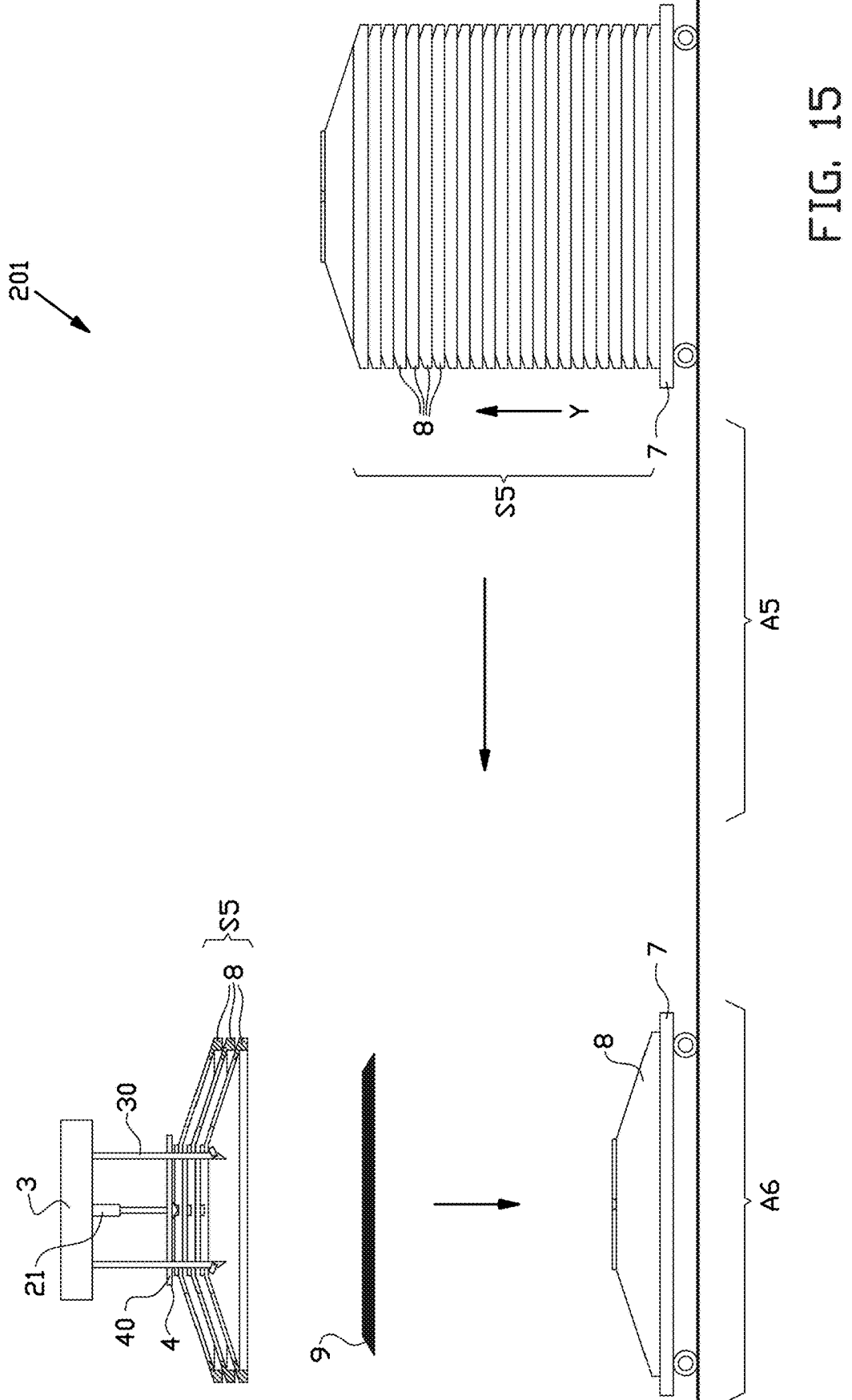

The first spacer stack S5 and the second spacer stack S6 are each provided on a carrier 7, for example a cart, pallet, carriage or cartridge, at the respective first station A5 and second station A6. The carriers 7 comprise a support for supporting the respective spacer stacks S5, S6 thereon. For example, as is shown in FIG. 15, a spacer 8 may be permanently or detachably attached to the carrier 7. Said attached spacer 8 may both accommodate a bead-apex 9 and support a stack of spacers 8 on top.

Figure 14:
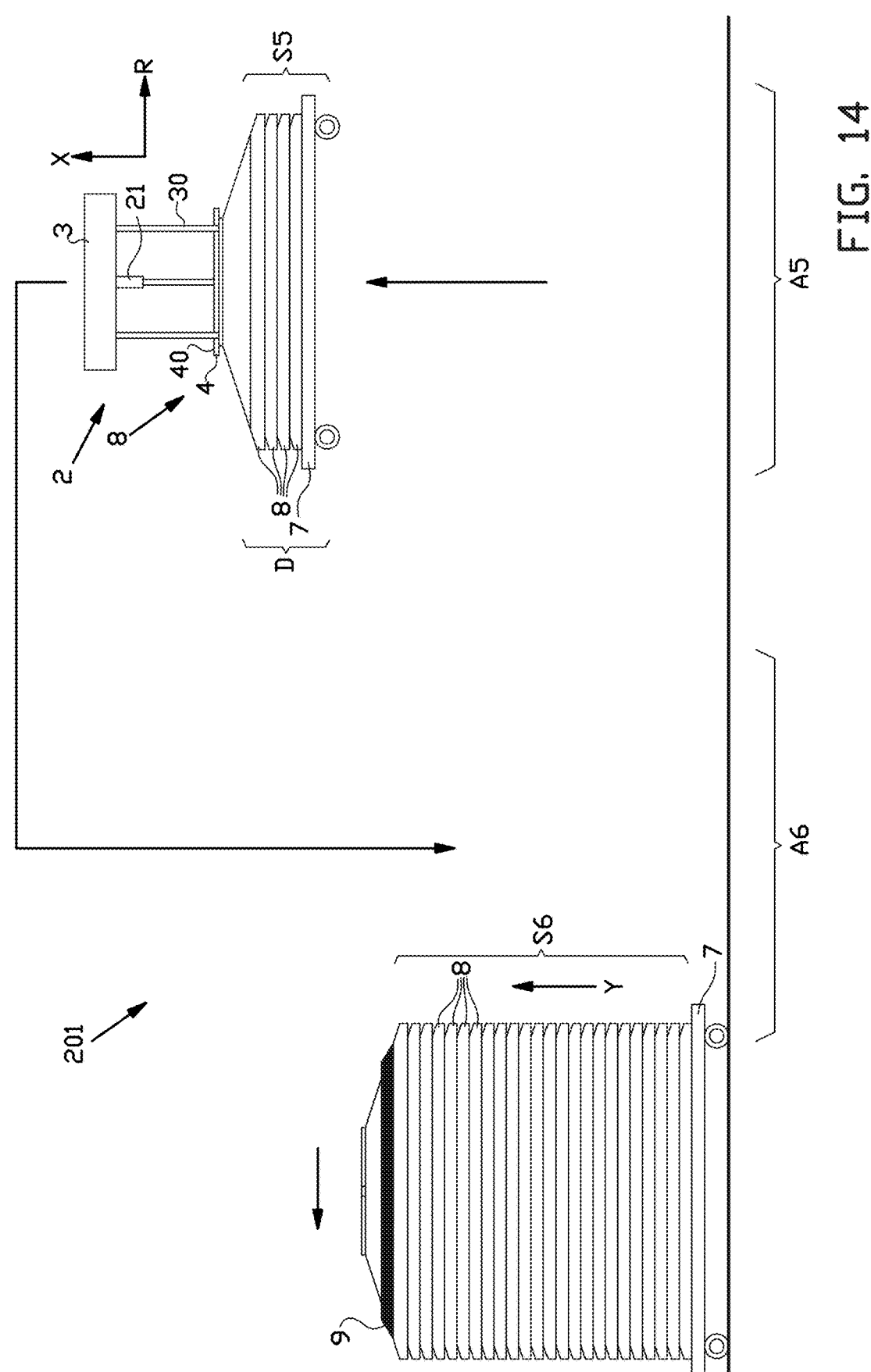

The handling assembly 201 further comprises the gripper 2 according to the present invention for transferring spacers 8 from the first station A5 to the second station A6. As is shown in FIG. 14, the gripper 2 is arranged to transfer a sub-stack D of spacers 8 together with the carrier 7. In the case of the spacer 8 attached to the carrier 7, the gripper 2 may conveniently grip said attached spacer 8 to transfer the carrier 7.

A further method for transferring spacers 8 from the first spacer stack A5 to the second spacer stack A6 will be described using FIGS. 12-15.

Figure 12:
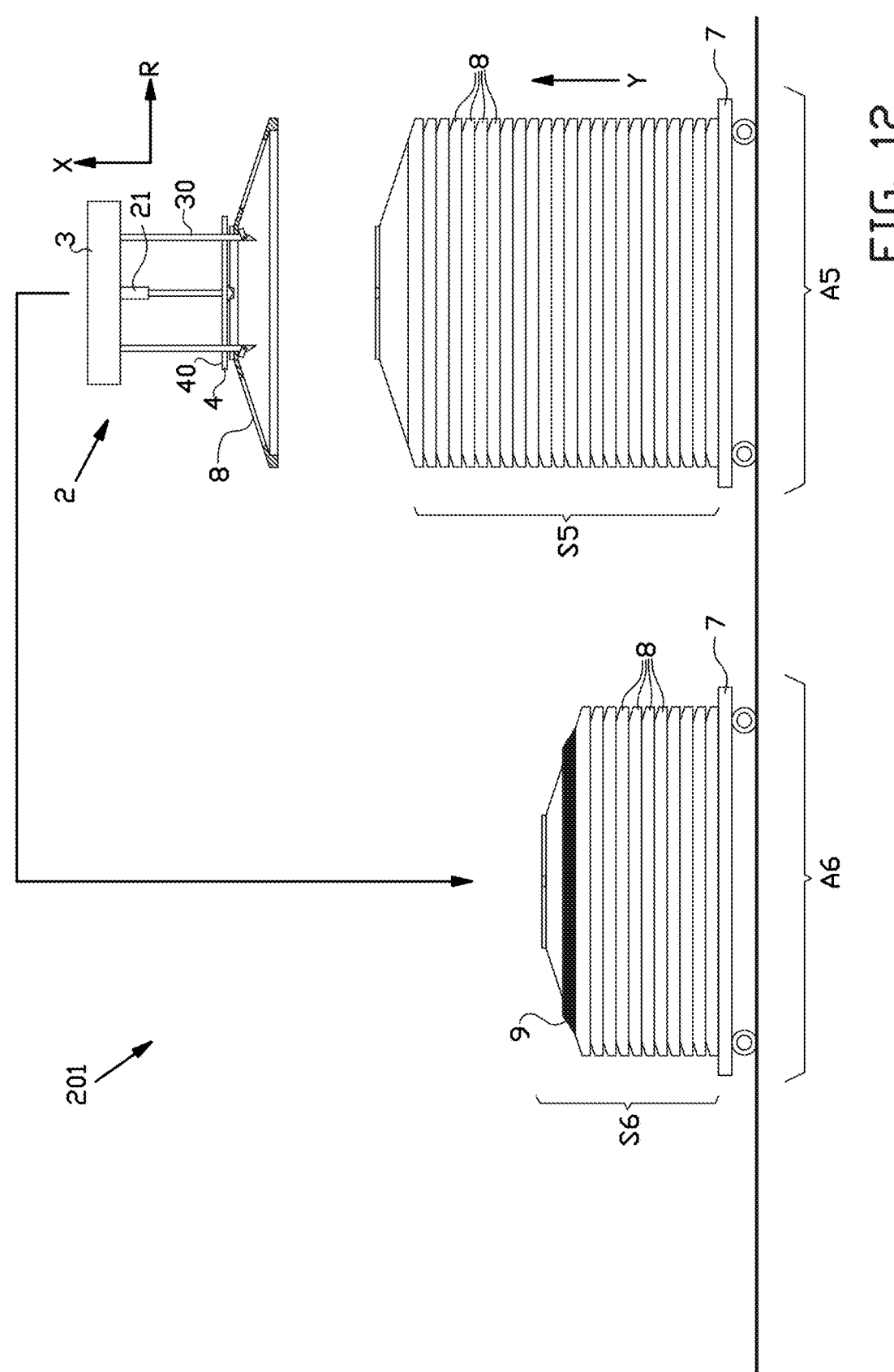
FIGS. 12-15 show an alternative handling assembly for spacers according to an alternative embodiment of the present invention.

As is shown in FIG. 12, a first carrier 7, carrying the first spacer stack S5, has been placed at the first station A5. In this embodiment, the first spacer stack S5 comprises empty spacers 8. A second carrier 7 has been placed at the second station A6. A second spacer stack S6, comprising spacers 8 provided with bead-apexes 9, has been formed on top of said second carrier 7. The gripper 2 has gripped the top most spacer 8 from the first spacer stack S5 to transfer said spacer 8 to the second spacer stack S6.

Figure 13:
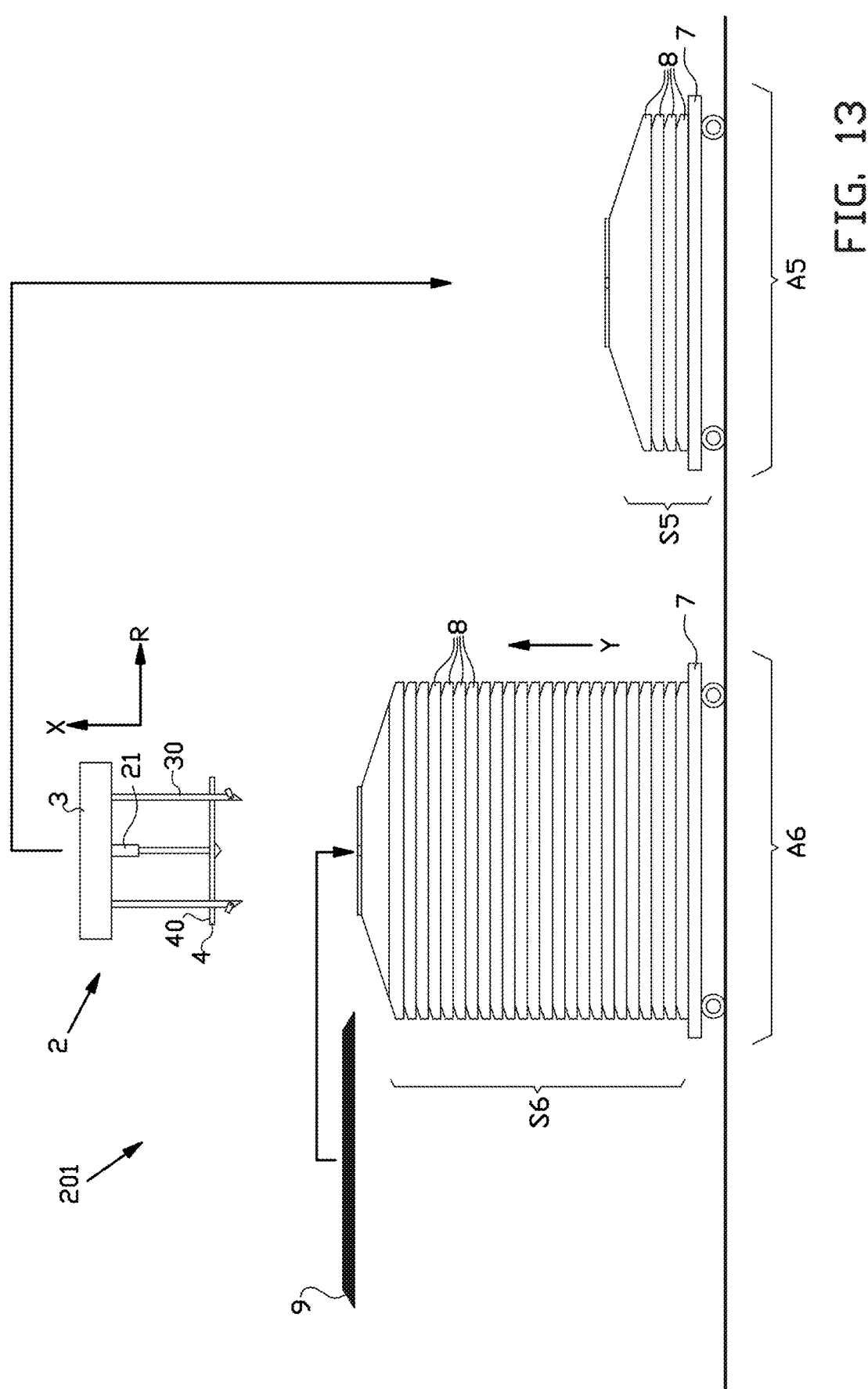

As is shown in FIG. 13, an amount of spacers 8 have been transferred from the first spacer stack S5 to the second spacer stack S6. In particular, the spacers 8 and bead-apexes 9 have been placed alternately at the second spacer stack S6. The first spacer stack S5 is nearly empty and replenishment of said first spacer stack S5 is almost needed. The gripper 2 has released an empty spacer 8 on top of said second spacer stack S6. The gripper 2 is subsequently moved back towards the first spacers stack S5. A bead-apex 9 is now transferred, for example from a bead-apex processing station (not shown) to said empty spacer 8 on top of the second spacer stack S6. Preferably, a separate bead-apex gripper (not shown) is used for the transfer of the bead-apex 9 to the spacer 8.

A similar method can be used for supplying bead-apexes 9 to a tire building drum. In the latter case, the first spacer stack S5 comprises spacers 8 which are each provided with a bead-apex 9. The bead-apex 9 is removed from the top most spacer 8 before said spacer 8 is transferred from the first spacer stack S5 to the second spacer stack S6.

As is shown in FIG. 14, the carrier 7 carrying the second spacer stack S6 is being removed from the second station A6 to allow a further carrier 7 to be placed at said second station A6. the gripper 2 has gripped the carrier 7 with the remaining first spacer stack S5 or sub-stack D of spacers 8 thereon to be transferred to the second station A6.

As is shown in FIG. 15, the gripper 2 has transferred the carrier 7 from the first station A5 and has deposited said carrier 7 at the second station A6. A new carrier 7 comprising a further stack of spacers 8 is being transferred to the first station A5 to replenish the first spacer stack S5.

In this particular embodiment, the gripper 2 has released the carrier 7 together with the entire sub-stack D of the spacers 8 at the second station A6. Subsequently, the gripper 2 has gripped a sub-stack D of spacers 8 leaving only the carrier 7 with the attached spacer 8 at the second station A6. A bead-apex 9 is now placed on said spacer 8 attached to the carrier 7. The gripper 2 may now, one by one, deposit each of the spacers 8 of the sub-stack D on top of the carrier in a similar manner to form a further second spacer stack S6 at the second station A6.

Alternatively, the gripper 2 may be arranged to release only the carriage 7 with the attached spacer 8, while retaining a remaining sub-stack D of the spacers 8. Subsequently, the spacers 8 of the sub-stack D are deposited on the carriage 7 one by one, while retaining the remaining spacers 8.

Hence, while the first stack S5 at the first station A5 is being replenished, the gripper 2 may continue to provide the spacers 8 of the sub-stack D of spacers 8 one by one to the carrier 7 at the second station A6. In particular, the first spacer stack S5 at the first station A6 may be replenished without or substantially without interrupting the process involving the supply of individual spacers 8 to the second station A6.

When the first spacer stack S5 at the first station A5 has been replenished and the gripper 2 has deposited all spacers 8 of the sub-stack D, the gripper 2 is used for transferring individual spacers 8 from the replenished first stack S5 at the first station A5 to the newly formed second stack S6 at the second station A6. Accordingly, the method steps as described above are repeated.

Figure 16:
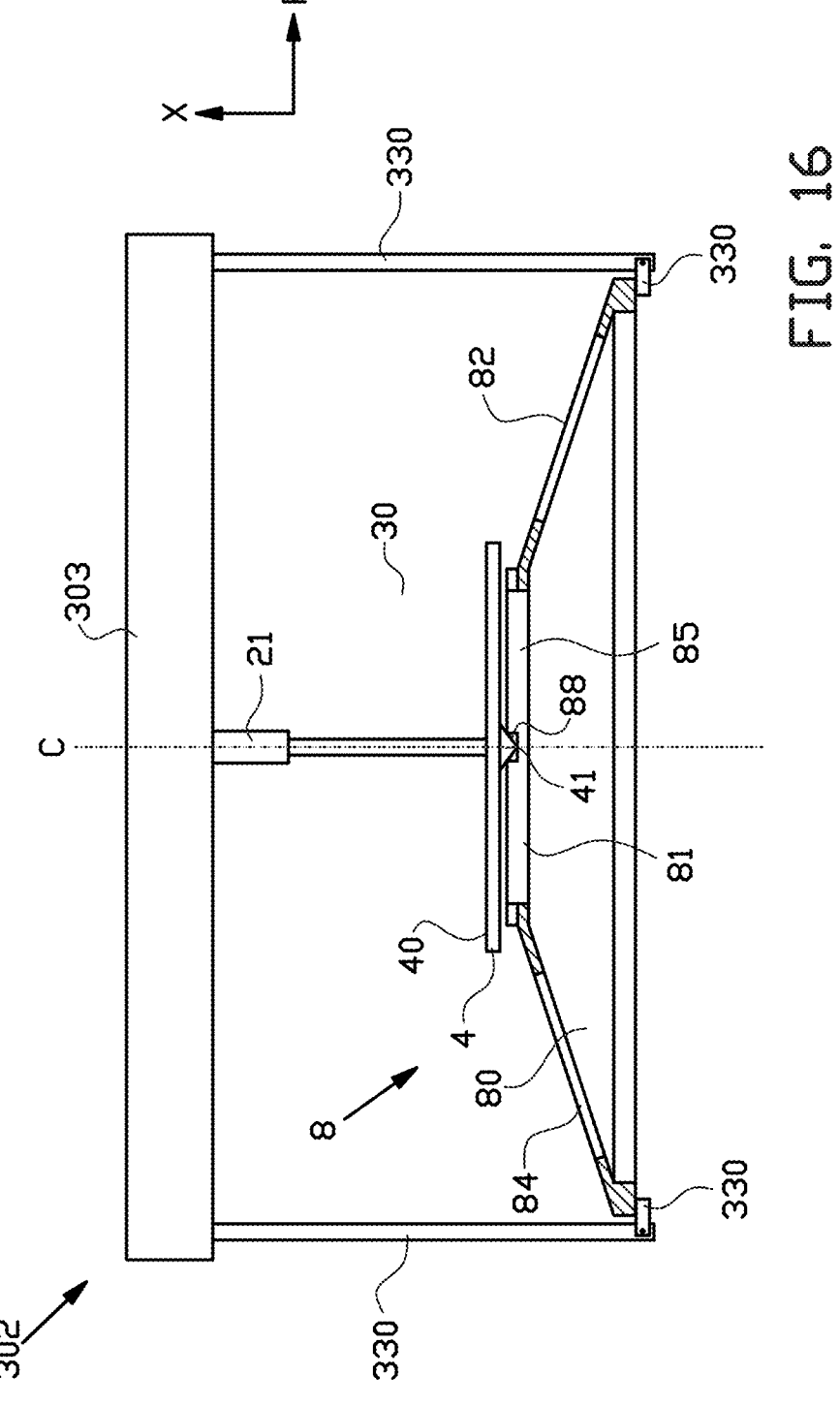
FIG. 16 shows a further alternative gripper according to a further embodiment of the present invention.

FIG. 16 shows the gripper 302 according to a further alternative embodiment of the present invention. The gripper 302 differs from the previously discussed gripper 2 in that the gripper head 303 is arranged to grip the outer circumference of the spacer 8. In particular, the gripper head 303 comprises alternative guide elements 330 extending radially outside of the spacer with respect to the central axis C. Accordingly, the lifting elements 331 are arranged to retain an outer rim of the spacer 8. In this particular embodiment, the lifting elements 331 are movable in a radially inner direction opposite to the radial direction R to reach under the outer rim of the spacer 8. Alternatively, the lifting elements 331 may form a bayonet type connection with the spacer, i.e. the lifting elements 331 may engage the spacer by a rotation about the central axis C.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

The invention claimed is:

1. A set of a spacer stack, comprising at least two spacers for storing a bead-apex, and a gripper for retaining a sub-stack of two or more of said spacers simultaneously,
   wherein each spacer comprises a spacer body extending circumferentially about a spacer axis and a central aperture that extends through the spacer body along said spacer axis, wherein each spacer further comprises an inner rim that extends circumferentially about the spacer axis and limits the central aperture radially,
   wherein the gripper comprises a gripper head extending in an axial direction parallel to a central axis and a plurality of spacer lifting elements supported by said gripper head for lifting the spacer,
   wherein the lifting elements are movable with respect to the gripper head for contacting the spacer,
   wherein the gripper further comprises a confining member for confining at least a part of the sub-stack of spacers in the axial direction between said confining member and the elements, wherein the confining member comprises a confining body extending in a radial plane perpendicular to the central axis, and wherein the confining member comprises one or more cams protruding from the confining body at a position spaced apart from the central axis, wherein the spacers comprise one or more notches corresponding to the cams of the confining member, wherein said one or more cams are arranged to be each inserted into a corresponding one of the one or more notches in the spacer.

2. The set of the spacer stack and the gripper according to claim 1, wherein the confining member and the lifting elements are movable relative to one another in the axial direction.

3. The set of the spacer stack and the gripper according to claim 2, wherein the gripper comprises a gripper drive for driving a relative movement between the lifting elements and the confining member.

4. The set of the spacer stack and the gripper according to claim 1, wherein the gripper is arranged for confining a sub-stack of at least three or at least four of the spacers simultaneously in the axial direction between the confining member and the lifting elements.

5. The set of the spacer stack and the gripper according to claim 1, wherein the confining body is a clamp ring.

6. The set of the spacer stack and the gripper according to claim 1, wherein the one or more cams protrude from the confining body in the axial direction.

7. The set of the spacer stack and the gripper according to claim 1, wherein at least one of the one or more cams is tapered.

8. The set of the spacer stack and the gripper according to claim 1, wherein the one or more cams are evenly distributed in a circumferential direction about the central axis.

9. The set of the spacer stack and the gripper according to claim 1, wherein the gripper head is arranged to reach into the central apertures formed by inner rims of the spacers of the sub-stack and wherein the lifting elements are movable with at least a vector component in the radial direction to engage the inner rim of the lowermost spacer of the sub-stack.

10. The set of the spacer stack and the gripper according to claim 1, wherein the gripper head is tapered towards a terminal end thereof for self-centering the gripper head with respect to a central aperture of the spacer.

11. The set of the spacer stack and the gripper according to claim 1, wherein the gripper further comprises a detector for detecting the presence of a bead-apex on the spacer.

12. The set of the spacer stack and the gripper according to claim 11, wherein the detector comprises an optical sensor for detecting the presence of a bead-apex on the spacer.

13. The set of the spacer stack and the gripper according to claim 11, wherein the detector comprises a contact sensor for detecting the presence of a bead-apex on the spacer.

14. The set of the spacer stack and the gripper according to claim 13, wherein the detector further comprises a probe which is arranged to be insertable in a radial aperture in a support surface of the spacer.

15. The set of the spacer stack and the gripper according to claim 14, wherein the probe is movable relative to the gripper head.

16. The set of the spacer stack and the gripper according to claim 15, wherein the gripper comprises a detector drive for driving the movement of the probe relative to the gripper head.

17. A handling assembly for handling spacers, wherein the handling assembly comprises a first station with a first spacer stack comprising a plurality of spacers and a second station for receiving a plurality of spacers to form a second spacer stack, wherein each spacer comprises a spacer body extending circumferentially about a spacer axis and a central aperture that extends through the spacer body along said spacer axis, wherein each spacer further comprises an inner rim that extends circumferentially about the spacer axis and limits the central aperture radially, wherein the handling assembly further comprises using a gripper for simultaneously transferring a sub-stack of two or more spacers from the first spacer stack at the first station to the second station, wherein the gripper comprises a gripper head extending in an axial direction parallel to a central axis and a plurality of spacer lifting elements supported by said gripper head for lifting the spacer, wherein the lifting elements are movable with respect to the gripper head for contacting the spacer, wherein the gripper further comprises a confining member for confining at least a part of the sub-stack of spacers in the axial direction between said confining member and the elements, wherein the confining member comprises a confining body extending in a radial plane perpendicular to the central axis, and wherein the confining member comprises one or more cams protruding from the confining body at a position spaced apart from the central axis, wherein said one or more cams are arranged to be each inserted into a corresponding notch in the spacer.

18. A method for transferring a sub-stack of two or more spacers for storing a bead-apex, from a first station to a second station, wherein, at said first station, a first spacer stack is provided comprising a plurality of spacers, wherein the method comprises the step of using a gripper to simultaneously transfer the sub-stack of spacers from the top of the first spacer stack to the second station, wherein the gripper comprises a gripper head extending in an axial direction parallel to a central axis and a plurality of spacer lifting elements supported by said gripper head for lifting the spacer, the spacers comprising one or more notches, wherein the lifting elements are movable with respect to the gripper head to engage the one or more notches, wherein the gripper further comprises a confining member for confining at least a part of the sub-stack of spacers in the axial direction between said confining member and the elements, and wherein the method comprises clamping the sub-stack between the lifting elements and the confining member during the transfer between two respective stations.

19. The method according to claim 18, wherein the method comprises the step of using the gripper to simultaneously transfer a sub-stack of at least three or at least four spacers from the top of the first spacer stack to the second station.

20. The method according to claim 18, wherein the first spacer stack is provided at the first station on a carrier, and wherein the method comprises the step of using the gripper to transfer the carrier together with the first spacer stack to the second station.

21. The method according to claim 20, wherein the first spacer stack comprises at least two spacers, and wherein the transfer of the carrier together with the first spacer stack comprises the steps of:

a) gripping the carrier together with the first spacer stack at the first station using the gripper;

b) depositing the carrier at the second station; and c) subsequently depositing the at least two spacers of the first spacer stack one by one on the carrier to form a second spacer stack at the second station.

22. The method according to claim 18, wherein the method further comprises the step of placing a bead-apex on the top most spacer or removing a bead-apex from said top most spacer at the first station or the second station.

23. The method according to claim 18, wherein the gripper further comprises a detector for detecting the presence of a bead-apex on the spacer, wherein the method comprises the steps of:

a) detecting the presence or absence of a bead-apex on the spacer;

b) selecting the second station based on the presence or absence of a bead-apex on the spacer; and c) transferring the sub-stack of spacers from the first station to the selected second station.

24. The method according to claim 23, wherein the presence or absence of the bead-apex on the spacer is detected using the detector of the gripper.

25. The method according to claim 18, wherein the method comprises the steps of:

a) centering the spacer with respect to the central axis;

b) rotating the spacer about said central axis into a predetermined rotational position.

26. The method according to claim 25, wherein the spacer comprises a profile and wherein the gripper comprises a complementary profile, wherein step b) comprises interlocking the profile of the spacer with the complementary profile of the gripper.

27. A set of a spacer stack comprising at least two spacers for storing a bead-apex, and a gripper for retaining a sub-stack of two or more of said spacers simultaneously, wherein each spacer comprises a spacer body extending circumferentially about a spacer axis and a central aperture that extends through the spacer body along said spacer axis, wherein each spacer further comprises an inner rim that extends circumferentially about the spacer axis and limits the central aperture radially, wherein the gripper comprises a gripper head extending in an axial direction parallel to a central axis and a plurality of spacer lifting elements supported by said gripper head for lifting the spacer, wherein the lifting elements are movable with respect to the gripper head for contacting the spacer, wherein the gripper further comprises a confining member for confining at least a part of the sub-stack of spacers in the axial direction between said confining member and the elements, wherein the confining member comprises a confining body extending in a radial plane perpendicular to the central axis, and wherein the confining member comprises one or more notches or recesses formed in the confining body at a position spaced apart from the central axis, wherein the spacers comprise one or more cams that protrude from the spacer and correspond to the notches of the confining member, wherein said one or more notches or recesses are arranged for receiving a corresponding one of the one or more cams protruding from the spacer.

* * * * *